No. 616,674. Patented Dec. 27, 1898.
T. HANN, W. BROMLEY, J. PRICE, A. H. SMITH & D. E. RADCLYFFE.
T. W. KENT, Executor of T. HANN, Dec'd.
DRIVING GEAR FOR VELOCIPEDES.
(Application filed Dec. 29, 1897.)
(No Model.) 2 Sheets—Sheet 1.
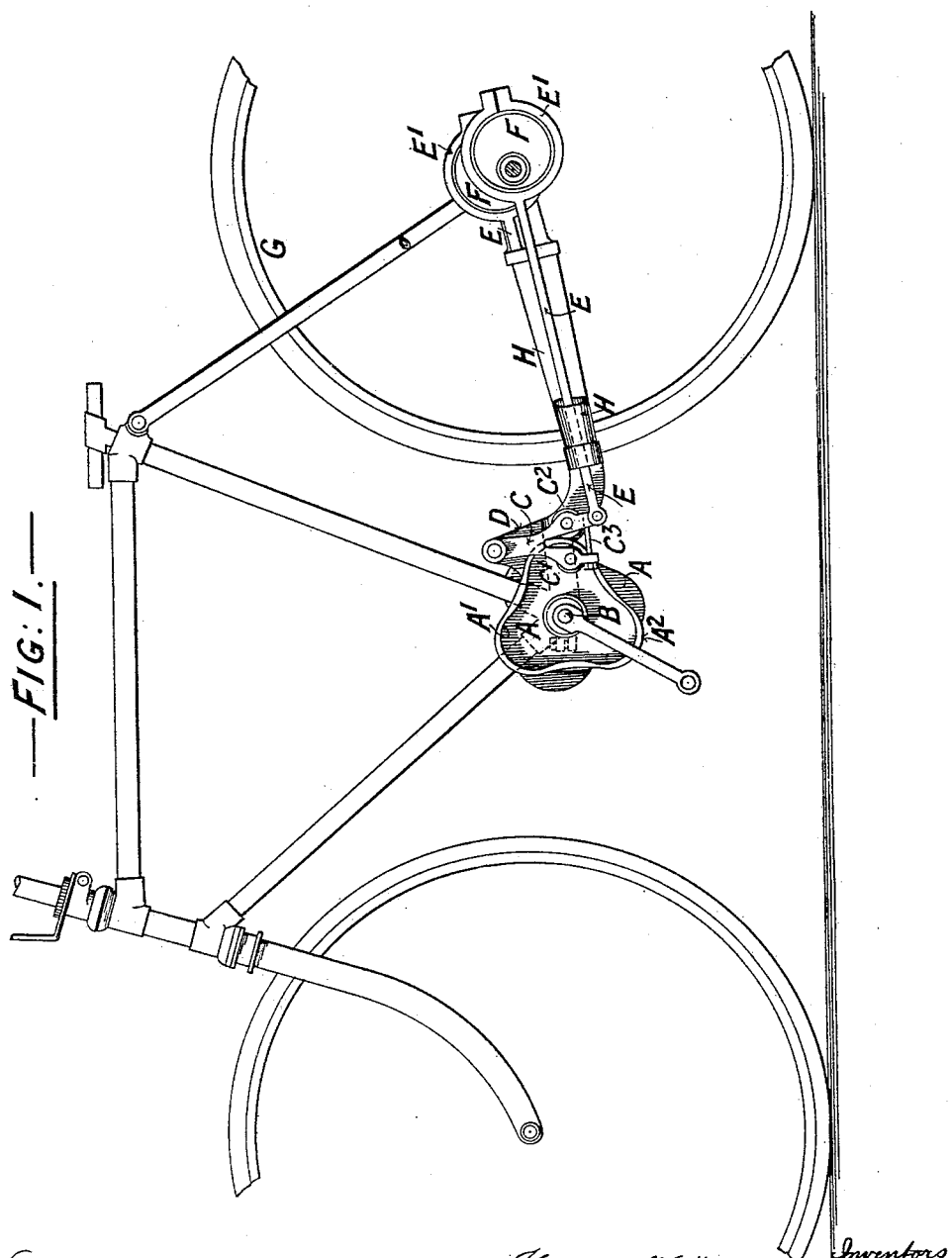

No. 616,674. Patented Dec. 27, 1898.
T. HANN, W. BROMLEY, J. PRICE, A. H. SMITH & D. E. RADCLYFFE.
T. W. KENT, Executor of T. HANN, Dec'd.
DRIVING GEAR FOR VELOCIPEDES.
(Application filed Dec. 29, 1897.)
(No Model.) 2 Sheets—Sheet 2.
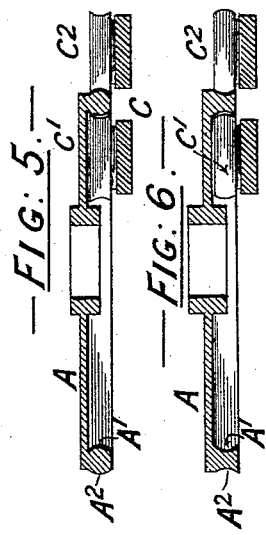
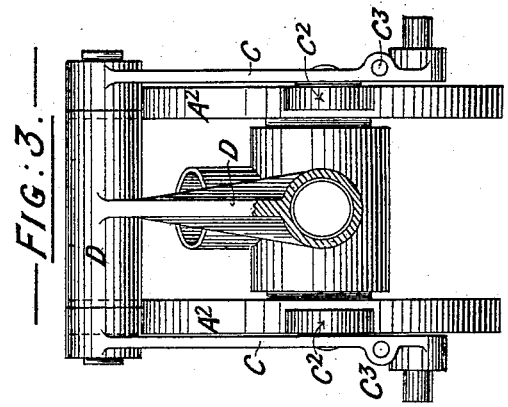
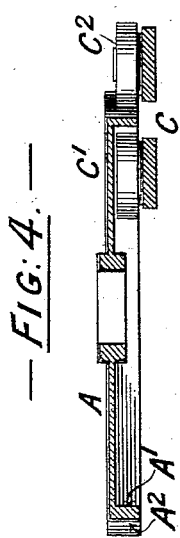
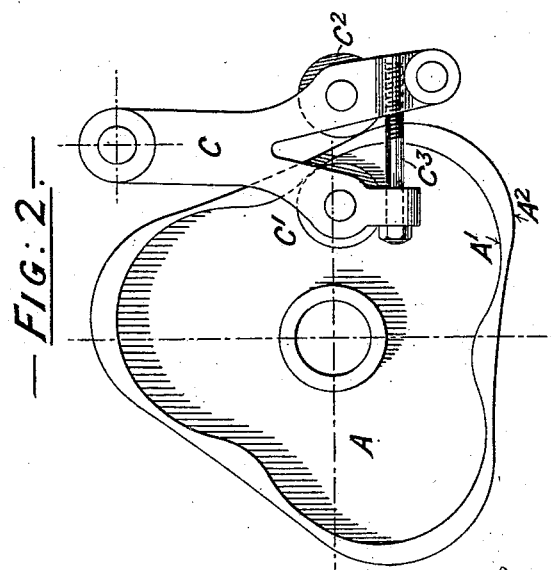

UNITED STATES PATENT OFFICE.

THOMAS WILLIAM KENT, EXECUTOR OF THOMAS HANN, DECEASED, WILLIAM BROMLEY, JOHN PRICE, ALFRED HENRY SMITH, AND DICK EDWARDS RADCLYFFE, OF LONDON, ENGLAND; SAID PRICE ASSIGNOR TO WILLIAM HENRY DACRE TYLER, OF SAME PLACE.

DRIVING-GEAR FOR VELOCIPEDES.

SPECIFICATION forming part of Letters Patent No. 616,674, dated December 27, 1898.

Application filed December 29, 1897. Serial No. 664,338. (No model.)

*To all whom it may concern:*

Be it known that THOMAS HANN, deceased, (THOMAS WILLIAM KENT being his executor, residing at Plumstead, county of Kent, England,) WILLIAM BROMLEY, JOHN PRICE, ALFRED HENRY SMITH, and DICK EDWARDS RADCLYFFE, subjects of the Queen of Great Britain, residing at London, England, have invented a new and useful Driving-Gear for Velocipedes and other Vehicles, (for which the said THOMAS HANN, deceased, WILLIAM BROMLEY, JOHN PRICE, ALFRED HENRY SMITH, and DICK EDWARDS RADCLYFFE have obtained a patent in Great Britain, No. 24,530, bearing date November 3, 1896,) of which the following is a specification.

Velocipedes are broadly known having a cam on the pedal-axle, the rotation of which cam reciprocates connecting-rods and communicates rotary motion to the driven road-wheel. Velocipedes have also been constructed which have upon each side of the framework a duplicate set of driving mechanism consisting upon each side of a multiple-throw grooved cam fixed on the usual pedal-axle, the cam acting upon a bowl carried at the end of a depending pivoted arm, the latter communicating motion to a crank on the road-wheel axle through the medium of a connecting-rod. Such cams as hitherto employed in velocipedes have been formed with a groove upon the plane face thereof or have acted by the outer periphery. Now in the first case considerable friction is caused by the roller being frequently in contact with both sides of the cam-groove, and the same roller is acted upon both during the thrust and return strokes. Moreover, when in velocipede-gearing the roller runs in a groove the latter is more liable to collect dust, and thereby cause obstruction to free working of the roller, than in a plane surface. In the second case, where the outer periphery of the cam acts upon a roller, the latter must be kept up to the cam-periphery, as by a spring, which in itself is not desirable, and even then the cam does not act in both directions upon the bowl, or if a peripheral acting cam is employed to give both thrust and return strokes then two bowls must be used which are in contact with the periphery upon opposite sides of the center of the cam, means must be provided, such as a bar passing across the cam to connect the bowls, and the bar must be guided in slides increasing the weight and number of parts, which is fatal to a successful cycle-gear.

Now the object of our invention is to provide a cam-gear for velocipedes where the two bowls are employed each running upon separate plane projecting cam-surfaces or rails formed upon the same cam-plate, one bowl transmitting the thrust and the other taking the return stroke, while both bowls are acted upon by the cam part or edge upon one side of the cam center and both bowls are carried by a single depending pivoted arm.

In constructing our driving-gear we fit upon both sides of the machine identically similar mechanism, and therefore it will be sufficient to describe that upon one side only.

Referring to Figure 1, which shows a rear-driven bicycle fitted with our improved driving mechanism, A is the cam-plate, which is keyed near the end of the pedal-axle B, and projecting laterally from the edge of the plane surface of the plate we form a cam-flange, so shaped as to be calculated to impart a required number of movements at each revolution to a pendent lever C, supported from a bearing carried by a bracket D on the framework of the machine. At Figs. 2, 3, and 4 this part of our improved mechanism is shown detached and drawn to a larger scale than the previous figure, Fig. 2 being an elevation of the cam and pendent lever C, carrying two bowls, Fig. 3 an end elevation of a pair of cams, pendent levers, and the bracket carrying the latter, and Fig. 4 a horizontal section of the cam, showing the peripheral contact edges and rollers against which the edges act, Figs. 5 and 6 being similar plan sectional views showing, respectively, a cam with convex edges and a similar cam with concave edges.

The pendent lever C carries two rollers or bowls C' C² at or near the pendent ends thereof, the rollers C' being acted on by the internal peripheral surface A' and the rollers C² by the exterior surface A² of the cam A.

To the rocked end of the pendent lever C we pivot one end of a connecting-rod E, which rod E extends to an eccentric-strap or sheave E' to actuate an eccentric F, fixed upon one side of the axle of the rear wheel G, and, as before stated, the mechanism upon both sides of the machine is exactly similar.

The connecting-rods E E may conveniently pass through the lower bottom stay-tubes H H.

It is a feature of our invention that in constructing the cam A to act by its peripheral surfaces A' A², as described, we make the flange of varying thicknesses, as shown at Figs. 1 and 2, so that when a part of the flange, as at Fig. 2, passes between the rollers C' C² in an angular position it shall fit the distance between the said rollers, while when a part of the flange passes in other positions the thickness shall be greater or less in order to equally occupy the space between the said rollers.

In order to accurately adjust and set the distance of the rollers C' C² from each other, we divide the end of each lever C and fit a bolt or screw C³, whereby the distance of the rollers may be adjusted. Generally we find that the elasticity of the divided ends of the levers C allow of sufficient adjustment; but, if desired, and as will be readily understood, one of the divided ends carrying one of the rollers might be hinged to the main part.

In some cases, with the object of preventing the bowls or rollers C' C² from becoming displaced laterally with respect to the acting peripheries of the cam, we groove or make the surfaces of the cam either convex, as at Fig. 5, or concave, as at Fig. 6, and form the edges of the rollers C' C² to fit such cam-surfaces; but generally we have found the plain edges, as at Fig. 4, to answer the purpose well.

The cams are shown on the drawings as calculated to impart three revolutions to the rear wheel at each revolution of the cams; but we may employ cams with other numbers of throws, if desired, and the cams may be interchangeable—that is, three-throw cams may be removed and four-throw or two-throw cams substituted therefor on the same machine, if desired. In this connection instead of fitting the cam-flanges to face outward, as shown at Fig. 1, we may arrange same to face inward, whereby the cam can obviously be removed from the shaft without disarranging the levers C or connecting-rods E.

What we claim, and desire to secure by Letters Patent, is—

1. In driving mechanism for velocipedes, the combination with the pedal-driven axle; of a plate fixed near each end thereof, laterally-projecting cam-shaped flanges on the plates calculated to communicate a required number of reciprocations, a pendent arm for each cam pivoted on the framework, two bowls carried at the end of each pendent lever to bear against opposite sides of the cam-flanges but upon one side of the axis of each cam-plate a rearwardly-extending connecting-rod pivoted to each pendent arm, eccentric-straps on the rear ends of the connecting-rods, and eccentrics keyed on the road-wheel axle onto which the eccentric-straps take, and by which the road-wheel is driven through the reciprocations communicated by the rotated cam-plates as set forth.

2. In driving-gear for velocipedes, the combination with the pedal-driven axle, a pendent arm pivoted on the framework of the machine, two bolts carried at the end of the pendent arm, and a cam-plate keyed on the pedal-driven shaft; of a cam-shaped flange of varying thickness projecting laterally from the plate, passing between the two bowls, and calculated to communicate reciprocations to the pendent arm, the cam-shaped flange being of varying thicknesses whereby at all times in its revolution the cam-flange fits the distance between the two bowls carried by the pendent lever; a connecting-rod pivoted to the pendent lever, and means whereby the connecting-rod is caused to communicate rotary motion to the road-wheel to be driven as set forth.

3. In driving-gear for velocipedes the combination with the pedal-driven shaft, a plate keyed on the pedal-shaft, and an annular cam-shaped flange, of varying thickness, projecting laterally from the plate; of a pendent arm pivoted on the framework, and having a forked end thereto, a roller pivoted upon each fork and located so that the cam-flange passes between the two rollers, a connecting-screw between the forked members of the pendent arm to draw the rollers together and adjust same to the cam-flange, and means whereby the motion communicated by the rotated cam-flange to the pendent arm is communicated to revolve the driven road-wheel substantially as set forth.

THOMAS WILLIAM KENT,
*Executor of the estate of Thomas Hann, deceased.*
WILLIAM BROMLEY.
JOHN PRICE.
ALFRED HENRY SMITH.
DICK EDWARDS RADCLYFFE.

Witnesses:
E. S. BREWER,
W. A. MARSHALL.